US007653681B2

(12) United States Patent
Alexander et al.

(10) Patent No.: US 7,653,681 B2
(45) Date of Patent: Jan. 26, 2010

(54) SOFTWARE ARCHITECTURE FOR MANAGING A SYSTEM OF HETEROGENOUS NETWORK PROCESSORS AND FOR DEVELOPING PORTABLE NETWORK PROCESSOR APPLICATIONS

(75) Inventors: Randall W. Alexander, Morrisville, NC (US); Seeta Hariharan, Raleigh, NC (US); David M. Perlsweig, Raleigh, NC (US); Sridhar Rao, Raleigh, NC (US); Ravinder K. Sabhikhi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/035,644

(22) Filed: Jan. 14, 2005

(65) Prior Publication Data

US 2006/0161764 A1 Jul. 20, 2006

(51) Int. Cl.
*G06F 15/16* (2006.01)
(52) U.S. Cl. ........................................ 709/201; 709/250
(58) Field of Classification Search ................. 709/201, 709/219, 220, 223, 227, 249, 250; 713/1
See application file for complete search history.

(56) References Cited

U.S. PATENT DOCUMENTS 5,551,035 A 8/1996 Arnold et al.

(Continued)

FOREIGN PATENT DOCUMENTS

EP 0518195 A2 6/1992

(Continued)

OTHER PUBLICATIONS

IBM Technical Disclosure Bulletin, *Inter-Process Communications Library*, vol. 36, No. 1, Jan. 1993, pp. 59-60.

(Continued)

*Primary Examiner*—Salad Abdullahi
*Assistant Examiner*—Madhu Khanna
(74) *Attorney, Agent, or Firm*—Yee & Associates, P.C.; Mark E. McBurney

(57) ABSTRACT

A method for developing portable network processor applications and/or managing heterogeneous network processors in a network is disclosed. The network includes host processor(s) utilizing system configuration application(s) that are network processor independent. In one aspect, the method and system include using standardized interface(s) for each network processor, using a standardized transport layer compatible with the interface(s), and providing a generic message application layer. The generic message application layer defines generic payload(s) and message type(s) for configuration communications between the network and host processors. In another aspect, the method and system include providing packet processing shell(s) and generic protocol software that is coupled with the packet processing shell(s) through standard interface(s), network processor independent, and performs operations for packet processing. The method also include providing a library that includes network processor specific information for performing the operations and providing block(s) for performing other network processor specific operations.

8 Claims, 5 Drawing Sheets

U.S. PATENT DOCUMENTS

| | | |
|---|---|---|
| 5,778,226 A | 7/1998 | Adams et al. |
| 6,014,702 A | 1/2000 | King et al. |
| 6,134,618 A * | 10/2000 | Hebert ....................... 710/105 |
| 6,370,682 B1 | 4/2002 | Eckardt et al. |
| 6,539,425 B1 * | 3/2003 | Stevens et al. .............. 709/220 |
| 2001/0014881 A1 | 8/2001 | Drummond et al. |
| 2002/0040469 A1 | 4/2002 | Pramberger |
| 2002/0065943 A1 | 5/2002 | Czajkowskie et al. |
| 2002/0083208 A1 | 6/2002 | Abdelnur |
| 2002/0091874 A1 | 7/2002 | Jones et al. |
| 2002/0154646 A1 | 10/2002 | Dubois et al. |

FOREIGN PATENT DOCUMENTS

| | | |
|---|---|---|
| JP | 2000-047888 | 2/2000 |

OTHER PUBLICATIONS

IBM Technical Disclosure Bulletin, *Automated Logistics and Production Solution Software Architecture*, vol. 34, No. 11, Apr. 1992, pp. 455-457.

* cited by examiner

SOFTWARE ARCHITECTURE FOR MANAGING A SYSTEM OF HETEROGENOUS NETWORK PROCESSORS AND FOR DEVELOPING PORTABLE NETWORK PROCESSOR APPLICATIONS

FIELD OF THE INVENTION

The present invention relates to computer systems, and more particularly to a method and system for providing a mechanism for allowing a host to manage network processors in a scalable, flexible manner and for developing portable network processor applications.

BACKGROUND OF THE INVENTION

Driven by increasing usage of a variety of network applications, such as those involving the Internet, computer networks are of increasing interest. In order to couple portions of a network together or to couple networks together, network processors residing in switches, routers, and/or other components are typically used. In order to adequately control the traffic through the network, the network processor must classify packets and perform a variety of other functions. Thus, a network administrator typically desires to manage the network processors. Such management includes, for example, configuring the network processors, being informed of issues in the network processor, and addressing these issues. This management is performed through communication between a host processor controlled by the network administrator and the network processors.

FIG. 1 depicts a block diagram of a conventional system 10 for managing network processors. The system 10 includes a conventional host processor 20 used by a network administrator and conventional network processors 30, 40, and 50. The owner of the system 10 typically purchases the conventional network processors 30, 40, and 50. The conventional host processor 20 typically includes conventional system configuration application 22 that is developed at least in part by the owner of the conventional system 10. The network administrator uses the conventional system configuration application 22 to configure, update, and otherwise manage the conventional network processors 30, 40, and 50 in the conventional system 10.

The conventional network processors 30, 40, and 50 each includes conventional control software/firmware 32, 42, and 52, respectively, and conventional protocol software/firmware 34, 44, and 54, respectively, that are used in configuring the network processors 30, 40, and 50, respectively, and for processing packets that arrive over the Internet. The conventional control software/firmware 32, 42, and 52 and the conventional protocol software/firmware 34, 44, and 54, respectively, may each be different. More specifically, the protocol software/firmware 34, 44, and 54 is particularly dependent upon the hardware of the network processors 30, 40, and 50, respectively, and thus differs. For example, the conventional network processors 30, 40, and 50 may include different versions of a particular model of network processor from a particular vendor and/or other model(s) of network processor that may be from other vendors. Thus, the conventional network processors 30 and 40 are depicted as having control software/firmware 32 and 42, respectively, and protocol software firmware 34 and 44, respectively, that are for different versions of a Model X network processor, while the control software/firmware 52 and the protocol software/firmware 54 of the conventional network processor 50 are for a Model Y network processor. Because of the differences between the conventional network processors 30, 40, and 50, each conventional network processor 30, 40, and 50 utilizes conventional application program interfaces (APIS) 12, 14, and 16, respectively, that are specific to the particular network processor 30, 40, and 50, respectively.

The conventional system configuration application 22 is used to configure and otherwise manage the conventional network processors 30, 40, and 50, respectively. The conventional system configuration application 22 thus includes corresponding conventional software modules 24, 26, and 28 for network processors 30, 40, and 50, respectively. Using the software modules 24, 26, and 28 specially developed for each network processor 30, 40, and 50, the host processor 20 can utilize the network processors 30, 40, and 50, respectively.

Although the conventional system 10 functions, one of ordinary skill in the art will readily recognize that the conventional system 10 is difficult to scale. The conventional network processors 30, 40, and 50 are typically heterogeneous in nature. Because the conventional network processors 30, 40, and 50 are heterogeneous, the conventional network processors may include different versions of a particular model of network processor and/or different models of network processor. In particular, the protocol software/firmware 34, 44, and 54 of different network processors are typically hardware dependent and, therefore, typically differ. Thus, the way in which particular network processors 30, 40, and 50 are configured may differ widely. Consequently, the software 24, 26, and 28 of the conventional system configuration application 22 are distinct. One of ordinary skill in the art will also readily recognize that the conventional system 10 may actually include a large number of network processors. Consequently, the number of network processors 30, 40, and 50 with which the conventional system configuration application 22 must be compatible may be large. As a result, the number of distinct software modules 24, 26, and 28 used by the conventional host processor 20 and developed by the owner of the conventional system 10 may be large. As a result, the conventional system configuration application 22 may be complex. It may thus be difficult to incorporate new network processors, which may have software/firmware not previously supported. The conventional system 10 is, therefore, difficult to scale. Because of difficulties in incorporating new software/firmware, evolving the conventional system configuration application 22 and the conventional system 10 to utilize improved network processors may be problematic.

One of ordinary skill in the art will also readily recognize that development of the conventional network processors 30, 40, and 50 consumes a significant amount of resources. The conventional protocol software/firmware 34, 44, and 54 depend intimately on the hardware of the corresponding conventional processors 30, 40, and 50, respectively. Consequently, different versions of the same network processor, such as network processors 30 and 40, may require the development of different protocol software/firmware 34, 44, and 54, respectively. Thus, providing a new network processor consumes additional development time. Further, because changes in the protocol software/firmware 34, 44, and 54 require changes in the software modules 24, 36, and 28, the changes in the protocol software/firmware 34, 44, and 54 ripple up to the host processor 20 in the manner discussed above.

Accordingly, what is needed is a system and method for allowing a host to configure network processors in a scalable, flexible manner. Also needed is a method for developing protocol software/firmware that is portable across heterogenous network processors. The present invention addresses such needs.

BRIEF SUMMARY OF THE INVENTION

The present invention provides a method and system for developing portable network processor applications and/or for communicating with and managing a plurality of heterogeneous network processors in a network. The network includes host processor(s) that utilize system configuration applications that are network processor independent. In one aspect, the method and system comprise using at least one standardized interface for each of the plurality of heterogeneous network processors as well as a standardized transport layer. The standardized transport layer is compatible with the at least one standardized interface. The method and system also comprise providing a generic message application layer. The generic message application layer defines at least one generic payload and at least one generic message type for configuration communications between the plurality of heterogeneous network processors and the at least one host processor. Thus, communication between the network processors and host processor(s) can be performed in a generic, platform independent manner. In another aspect, the method and system comprise providing at least one packet processing shell that includes at least one generic protocol software block. The at least one generic protocol software block is coupled with the at least one packet processing shell through at least one standard interface. The generic protocol software block performs a plurality of operations for processing a packet and is network processor independent. In this aspect, the method and system also comprise providing at least one library that is coupled with the at least one packet processing shell. The at least one library includes network processor specific information for performing the plurality of operations. The method and system further includes providing at least one network processor specific block for performing network processor specific operations.

According to the system and method disclosed herein, the present invention provides a generic mechanism for configuring network processors. As a result, a customer need not maintain different software modules for different types (e.g. models and/or versions) of network processors. Moreover, development of software for new network processors may also be simplified for the makers of network processors may be simplified.

DETAILED DESCRIPTION OF THE INVENTION

Figure 1:
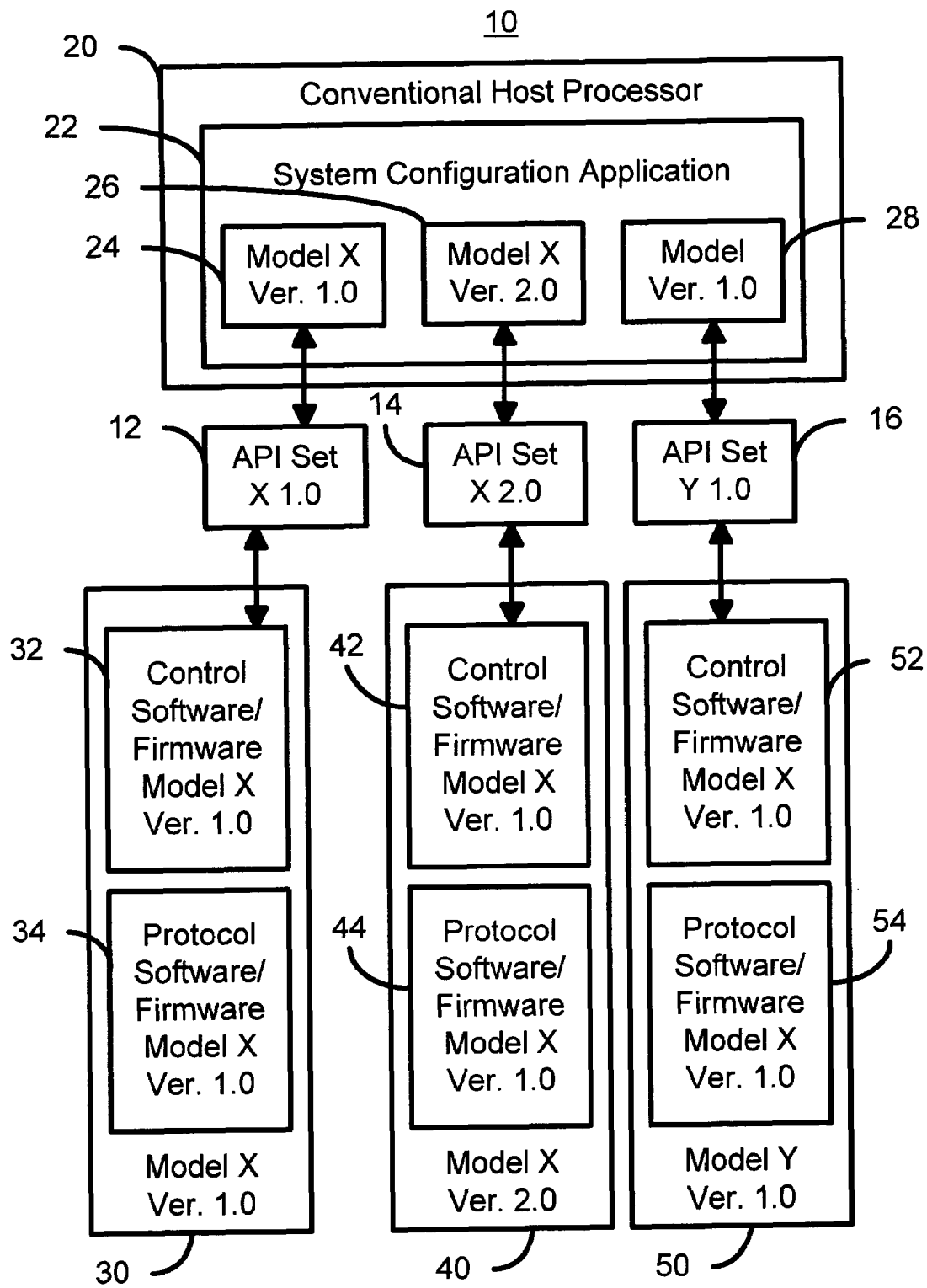
FIG. 1 is a diagram of a conventional system for managing conventional network processors.

The present invention relates to an improvement in computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for developing portable network processor applications and/or for communicating with and managing a plurality of heterogeneous network processors in a network. The network includes host processor(s) that utilize system configuration applications that are network processor independent. In one aspect, the method and system comprise using at least one standardized interface for each of the plurality of heterogeneous network processors as well as a standardized transport layer. The standardized transport layer is compatible with the at least one standardized interface. The method and system also comprise providing a generic message application layer. The generic message application layer defines at least one generic payload and at least one generic message type for configuration communications between the plurality of heterogeneous network processors and the at least one host processor. Thus, communication between the network processors and host processor(s) can be performed in a generic, platform independent manner. In another aspect, the method and system comprise providing at least one packet processing shell that includes at least one generic protocol software block. The at least one generic protocol software block is coupled with the at least one packet processing shell through at least one standard interface. The generic protocol software block performs a plurality of operations for processing a packet and is network processor independent. In this aspect, the method and system also comprise providing at least one library that is coupled with the at least one packet processing shell. The at least one library includes network processor specific information for performing the plurality of operations. The method and system further includes providing at least one network processor specific block for performing network processor specific operations.

The present invention will be described in terms of a particular computer system and a particular network processor having certain components. However, one of ordinary skill in the art will readily recognize that this method and system will operate effectively for other computer systems and network processors. The present invention is also described in the context of a network including specific components and a particular number of components. However, one of ordinary skill in the art will readily recognize that the present invention is consistent with other networks containing other and/or additional components as well as another number of components. The present invention is also described in the context of particular types of tables. One of ordinary skill in the art will readily recognize that the method and system are consistent with other types of tables.

Figure 2:
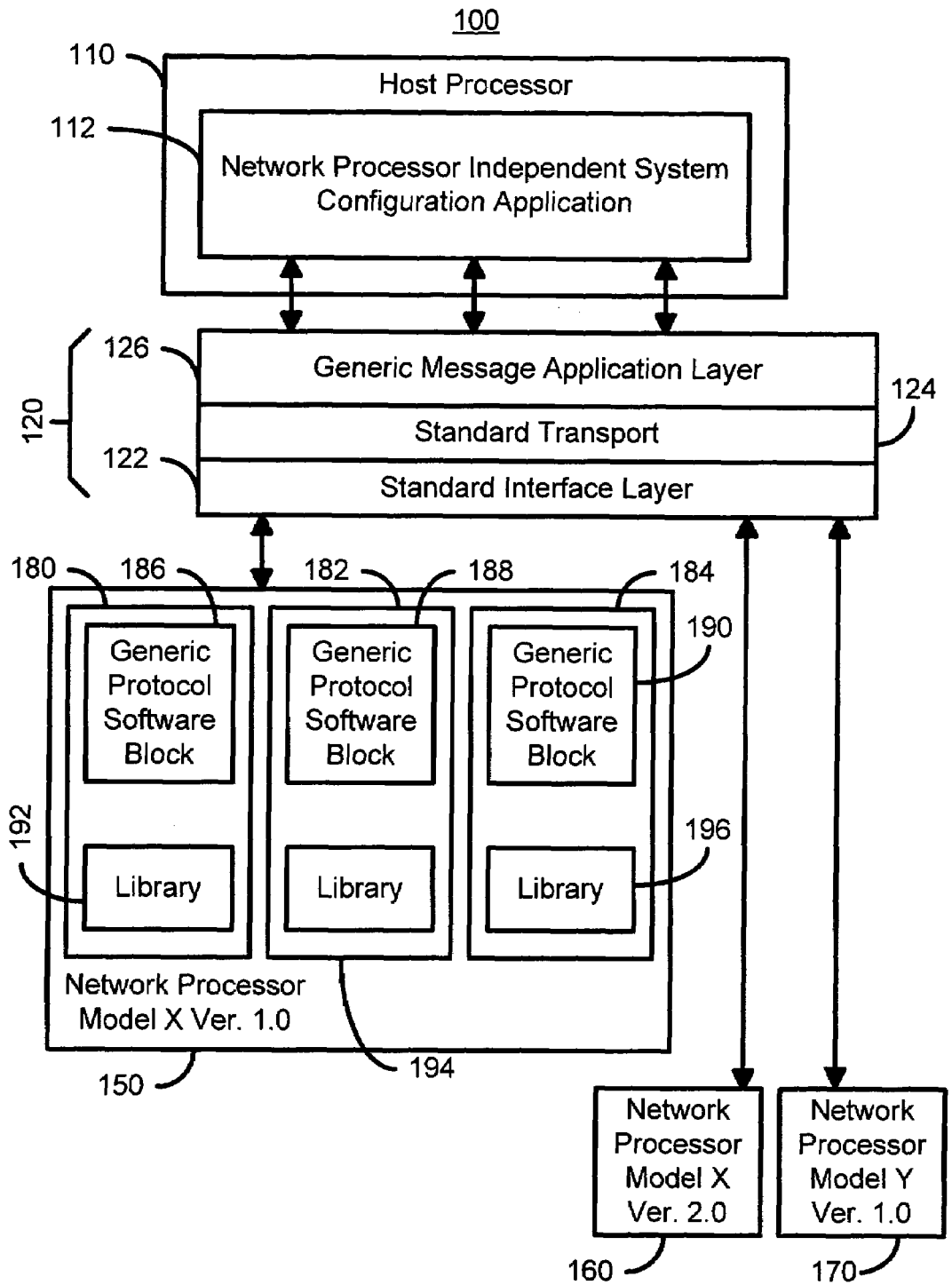
FIG. 2 is a high-level diagram of one embodiment of a system in accordance with the present invention for managing network processors.

To more particularly illustrate the method and system in accordance with the present invention, refer now to FIG. 2, depicting one embodiment of a system 100 in accordance with the present invention for managing network processors. The system 100 includes a host 110 and network processors 150, 160, and 170. Note that although only one host 110 is depicted, nothing prevents the use of another number of hosts (not shown). The system 100 allows the host 110 to utilize a network processor independent system configuration application 112. Because of the use of the method and system 100 in accordance with the present invention, the system configuration application 112 is network processor independent. The system 100 includes a communication system 120 that allows the host 110 to communicate in a generic, or network processor independent, manner. In particular, the communication system 120 includes standard interfaces 122 for the host 110 and network processors 150, 160, and 170, a standard transport layer 124, and a generic message application layer 126. The communication system 120 allows the host 110 and the network processors 150, 160, and 170 to communicate in a network processor independent manner. The network processors 150, 160, and 170 each includes a processing environment. For clarity, the processing environment is described in the context of the network processor 150 only. The processing environment includes a packet processing shell 180, 182, and 184, shown in the network processor 150 only. Each packet processing shell 180, 182, and 184 includes a generic protocol software block 186, 188, and 190, respectively, and a library 192, 194, and 196, respectively. The processing environment allows the generic protocol software blocks 186, 188, and 190, which are typically provided by the buyer of the network processor 150 rather than the vendor, to be network processor independent. The generic protocol software blocks 186, 188, and 190 thus control processing of a packet, but do so in a network processor independent manner. In order to perform the network processor specific functions used in processing the packet, the generic protocol software blocks 186, 188, and 190 utilize the library 192, 194, and 196, respectively. The library 192, 194, and 196 includes information required to perform network processor specific operations. Consequently, the generic protocol software blocks 186, 188, and 190 provided by the buyer of the network processor 150 can be network processor independent manner, yet perform the network processor specific operations. Further, the network processors 150, 160, and 170 can communicate with the host processor 110 in a network processor independent, or generic, manner.

As can be seen in FIG. 2, the system 100 can be viewed as including three portions that aid in ensuring that the host processor 110 and system configuration application 112 can be network processor independent and that the system 100 is scalable. First, the system standardizes, and makes generic communication between the host processor 110 and network processors 150, 160, and 170 using the system 120. Second, a processing environment that allows the generic protocol software blocks 186, 188, and 190 to be made generic, or network processor independent, is used. Thus, generic protocol software blocks 186, 188, and 190 that are provided by the buyer of the network processors 150, 160, and 170, can be network processor independent and easily incorporated in a scalable system. Third, the ability of the network processor 150, 160, and 170 to perform network processor specific operations, for example in manipulating packets, while functioning with the generic protocol software blocks 186, 188, and 190 is preserved by providing the library 192, 194 and 196.

Thus, using the communication system 120, the host processor 110 and network processor 150 can communicate in a network processor specific independent manner. Furthermore, using the programming environment including the packet processing shells 180, 182, and 184 and libraries 192, 194, and 196, respectively, the protocol software blocks 186, 188, and 190 can be generic. Because the host processor 110 can use network processor independent system configuration application 112, can communicate with heterogeneous network processors 150, 160, and 170 in a network processor independent manner, and the network processors 150, 160, and 170 include programming environments that allow the protocol software blocks 186, 188, and 190 that are network processor independent, the system 100 is scalable and more easily managed than a conventional system such as the conventional system 10 depicted in FIG. 1. Referring back to FIG. 2, note that all portions of the system 100 need not be implemented to obtain benefits over conventional systems. In particular, the communication system 120 and the network processors 150, 160, and 170 having the components discussed above, can be separately implemented.

Figure 3:
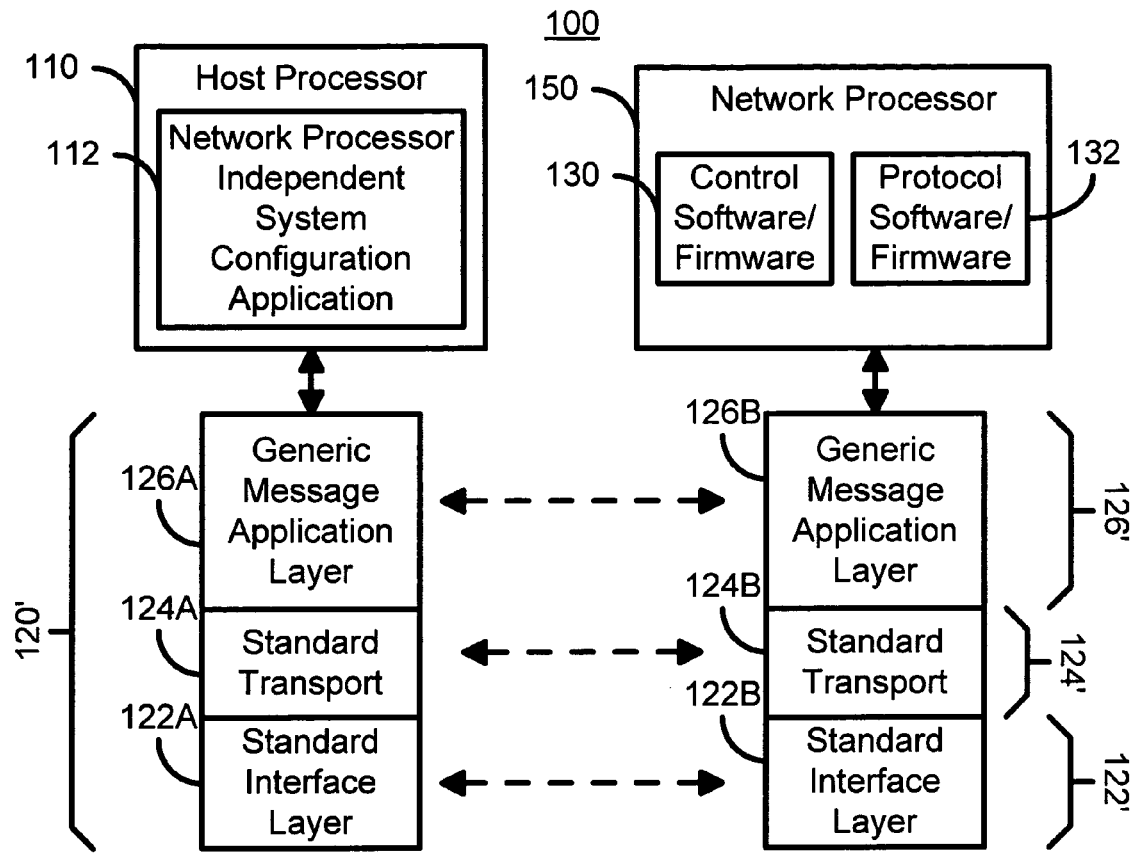
FIG. 3 is a high-level diagram of one embodiment of a system in accordance with the present invention for communicating between network processors and host processors.

FIG. 3 is a high-level diagram of one embodiment of a system 120' in accordance with the present invention for communicating between network processors and host processors. The system 120' can thus be used in the system 100 depicted in FIG. 2. Referring back to FIG. 3, also depicted is host processor 110 having network processor independent system configuration application 112 and network processor 150. For clarity, only one network processor 150 is depicted. However, another number of network processors could be used. The network processor 150 is depicted as including control software/firmware 130 and protocol software/firmware 132. In one embodiment, the control software/firmware 130 and protocol software/firmware 132 may be conventional, network processor dependent application. In an alternate embodiment, the control software/firmware 130 and protocol software/firmware 132 may be at least partially network independent, as described below in FIGS. 5-6.

The communication system 120' can be viewed as including three layers, an interface layer 122', a transport layer 124', and an application layer 126'. The standard interface layer 122' includes portions 122A and 122B for the host 110 and network processor 150, respectively. The standard interface layer 122' is a hardware layer that preferably uses any one of several industry standards interfaces (not specifically shown). The standard transport layer 124' includes portions 124A and 124B for the host 110 and network processor 150, respectively. For example, in a preferred embodiment, the standard transport layer 124' uses TCP-IP. However, nothing prevents the use of another mechanism. However, such a mechanism should be reliable and connection-based.

The application layer 126' also includes portions 126A and 126B for the host processor 110 and network processor 150, respectively. The application layer 126' defines a generic, or network processor independent, messaging scheme for use in communicating between the network processor 150 and the host processor 110. In particular, the application layer 126' provides generic (network processor independent) payloads for operations invoked by the system configuration application 112. In particular, the application layer 126' describes message elements and message types for providing requests, responses, and other communications between the host processor 110 and network processor 150. Furthermore, in a preferred embodiment, the single or multiple requests, responses or other communications may be bundled into a single message. Furthermore, the application layer 126' allows the host 110 to communicate with an individual network processor 150 or to broadcast to multiple network processors (not depicted in FIG. 3).

Figure 4:
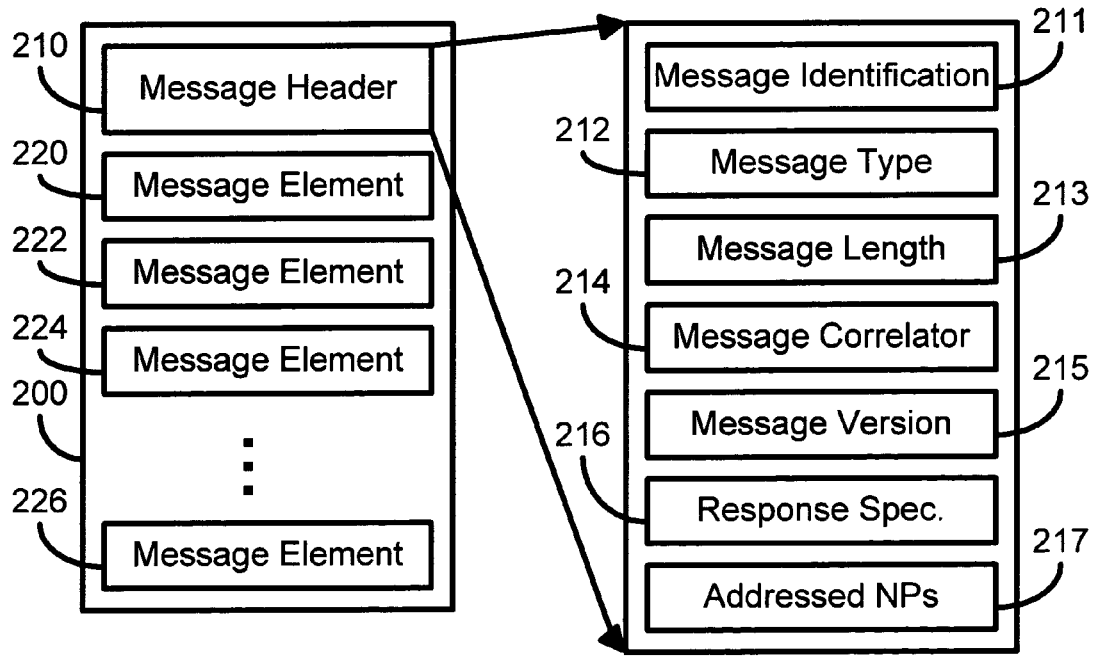
FIG. 4 is a diagram depicting one embodiment of a message in accordance with the present invention.

FIG. 4 is a diagram depicting one embodiment of a message 200 in accordance with the present invention. Referring to FIGS. 3 and 4, in accordance with the provisions of the application layer 126', a message includes at least one element and has a particular type, depending upon the function of and elements within the message. The message 200 includes elements 220, 222, 224, and 226 as well as a header 210. The header indicates a message identification 211, a message type 212, a message length 213, a message correlator 214, a message version 215, a response specification 216, and the network processors that are addressed 217. In a preferred embodiment, the message header has a fixed length. The message identification 211 indicates the specific message. In a preferred embodiment, there are three types of message identifications that are used to manage the packet processing shell, to perform network processor control path activities, and to perform data path activities. The message type 212 preferably indicates one of three types of messages. The message types 212 preferably include request, response, and notify messages. The message length 213 indicates the total length of the message, preferably in bytes. The message correlator 214 is provided by an entity originating a request message and returned unmodified in a response message. The message version 215 indicates a version of the application layer 126' and provides a way for entities to synchronize versions. The response specification 216 is applicable only for request message types and indicates the conditions under which a response message is expected. In a preferred embodiment, the response specification 216 includes four values that correspond to always generating a response message, never generating a response message, generating a response message for errors only, and generating a response message for successes only. The network processors addressed 217 indicates additional network processes that are connected to a particular, primary network processor and to which the message 200 also applies. The network processors addressed 217 thus applies to messages of the request type.

As discussed above, the message type 212 preferably indicates that the message 200 is one of three types: request, response, and notify. These message types correspond to particular message elements such as the elements 220, 222, 224, and 226. In a preferred embodiment, there are four types of message elements: invoke, result, error, and event. An invoke element is used to carry operation requests and are part of request message types. An invoke element preferably includes invoke identification, operation code, response specification, operation version, parameter length and parameters fields. The invoke identification is used to correlate application requests with results or errors. The operation code indicates the nature of the operation being requested. The response specification indicates the conditions under which a response is expected, as discussed above. The parameter length field indicates the lengths of the parameters field. Note that the invoke identification, operation code, and operation version fields are the same in all message elements. Result elements indicate the result of operations and are, therefore, contained in messages having a response type. Result elements include invoke identification, operation code, reserved, operation version, result length, and results fields. The result length indicates the length of the result field. Error message elements provide error information and may be part of a response message. Error message elements include invoke identification, operation code, reserved, operation version, error length, error code, and error detail fields. The error length field indicates the length of the error details field. The error code indicates the nature of the error. An event element is used to convey information associated with events occurring in a network processor. An event element includes event severity, event class, event identification, event data length, and event data fields. The event severity indicates the severity, or criticality, of the event being reported. The event class indicates a particular class of events being reported, such as congestion control. The event identification specifies the precise nature of the event within a particular class of events. The event data length indicates the length of the event data area. Event elements are only carried in notify messages.

As discussed above, each type of message 200 include particular elements. A request type of message includes at least one invoke message element. In addition, a request type of message originates at a host processor and is targeted to one or more network processors. A response type message may include at least one response message element and/or at least one error element. A response type of message originates at a network processor and is addressed to the host processor that originated the request type of message being responded to. Notify type messages may include one or more event elements. Notify messages are generated in an unsolicited manner from network processor(s) and are destined for host processor(s).

Thus, the application layer 126' defines generic message types and message elements. Consequently, the application layer 126' defines a generic payload for messages that allow the host processor 110 and network processors 150, 160, and 170 to communicate in a network processor independent manner. More specifically, the application layer 126' aids in allowing the network processors 150, 160, and 170 to be configured, initialized, and otherwise managed in a network processor independent manner.

Figure 5:
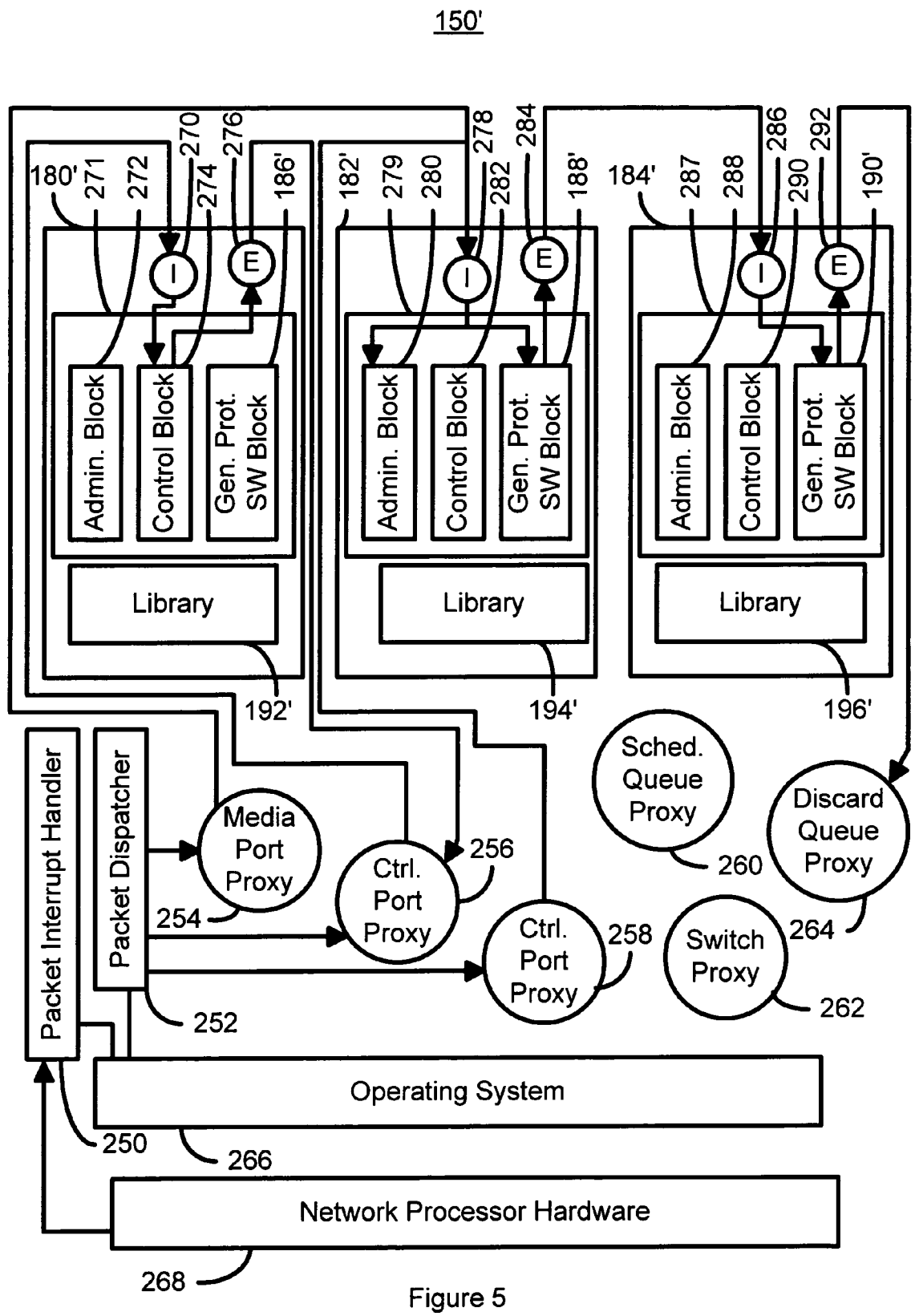
FIG. 5 depicts one embodiment of a network processor in accordance with the present invention.

FIG. 5 depicts one embodiment of a network processor 150' in accordance with the present invention. The network processor 150' can thus be used in the system 100 depicted in FIG. 2. Referring back to FIG. 5, the network processor 150' includes packet processing shells 180', 182', and 184' having generic protocol software blocks 186', 188', and 190', respectively, and libraries 192', 194', and 196', respectively. The network processor 150' also includes a packet interrupt handler 250, a packet dispatcher 252, media port proxy 254, control port proxies 256 and 258, optional scheduling queue proxy 260, switch proxy 262, and optional discard queue proxy 264. The port proxies 254, 256, and 258 and the queue proxies 260 are used to encapsulate the behavior of corresponding ports (not specifically depicted) and queues (not specifically shown). Also depicted is operating system 266 and network processor hardware 268. Note that in general, the components 180', 182', 184',192', 194', 196', 250, 252, 254, 256, 258, 260, 262, 264, 266, and 268 are provided by a vendor of the network processor 150', while the generic protocol software blocks 186', 188', and 190' are provided by the customer/buyer or user of the network processor 150'. Thus, the generic protocol software blocks 186', 188', and 190' are preferably pluggable into the packet processing shells 180, 182, and 194, respectively, through standard interfaces that are preferably do not vary between network processors. Note that a network processor might have other packet processing shells and other and/or additional components that are not shown for clarity. In a preferred embodiment, such packet processing shells and components would function in an analogous manner to that discussed herein.

The combination of the components 180', 182', 184', 250, 252, 254, 256, 258, 260, 262, and 264 of the network processor 150' may be considered to constitute a processing environment that allows the generic protocol software blocks 186', 188', and 190' to be network processor independent and, therefore, portable across different models and versions of network processors. In particular, this processing environment allows essentially the same look and feel to be provided across network processors that are different versions or completely different models. Thus, the components 180', 182', 184', 250, 252, 254, 256, 258, 260, 262, and 264 are specific to the network processor 150', yet allow the generic protocol software blocks 186', 188', and 190' to be generic. Note that in an alternate embodiment, components other than the components 180', 182', 184', 250, 252, 254, 256, 258, 260, 262, and 264, but having analogous functions may be used.

The libraries 192', 194', and 196' allow network processor specific operations to be performed using the generic protocol software blocks 186', 188', and 190'. The libraries 192', 194', and 196' also have network processor independent interfaces. Thus, the libraries 192', 194', and 196' can be utilized by the generic protocol software blocks 186', 188', and 190'. The libraries 192', 194', and 196' may be used in packet manipulation operations and table lookups. For example, such operations may include performing operations such as reading, writing, or otherwise altering packets, constructing control packets, reporting events, logging errors, performing table lookups, making calls to the operating system 266 in an operating system independent manner for operations such as timers, thread synchronization and memory allocation.

In a preferred embodiment, the packet interrupt handler 250 is used to wake up the packet dispatcher 252 in response to a packet being received. The packet interrupt handler 250 also disables further packet interrupts, which are later reenabled by the packet dispatcher 252. The packet dispatcher 252 dequeues the packet from the receive queue (not shown), determines the source port at which the packet arrived, and provides the packet to the appropriate port proxy 254, 256, or 258. The port proxies 254, 256 and 258 handle receiving and transmitting packets as well as configuring, enabling, and disabling the corresponding port (not separately shown). Further, the packet port proxies 254 determine the classification of the packet and provides to the appropriate packet processing shell 180', 182', or 184' based on the classification. If the appropriate packet processing shell 180', 182', or 184' is ready to receive the packet, then the packet is enqueued. Otherwise, the packet processing shell 180', 182', or 184' temporarily blocks acceptance of the packet. Thus, classification, distribution, and delivery of packets are performed in a network processor specific manner using components 250, 252, 254, 256, 258, 260, and 262 that can be provided exclusively by the vendor.

As depicted in FIG. 5, each packet processing shell 180', 182', and 184' includes connectors 270 and 276, 278 and 284, and 286 and 292, respectively, packet processing applications 271, 279, and 287, administrative block 272, 280, and 288, respectively, and control block 274, 282, and 290, respectively. Further, each packet processing shell 180', 182', and 184' performs administrative functions such as enabling, disabling, resetting, configuring, pausing, resuming, terminating, and querying the packet processing applications 271, 279, and 287. The packet processing shell 180', 182', and 184' process control and protocol packets, protocol wait timeouts, as well as parse control/administration packets. In addition, the packet processing in a preferred embodiment, each packet processing shell 180', 182', and 184' has a different function and is executed in a separate processing function. The function of the components 270, 272, 274, 276, 278, 280, 282, 284, 286, and 288 will be described in the context of the packet processing shell 180'.

The ingress connector 270 is an entry point into the packet processing shell 180'. The administrative block 272 includes an administrative queue (not depicted) that holds unprocessed administrative request packets and aids in performing administrative functions. Similarly, the control block 274 has a control queue (not shown) that stores incoming configuration/control request packets. The control block 274 also aids in performing control functions such as processing control packets. The generic protocol software block 186' utilizes a protocol queue to hold protocol request packets and processes protocol packets. In one embodiment, other queue(s), such as a queue for storing incoming response packets, may be used. In addition, the packet processing application 271 also invokes the packet library to manipulate the packet being processed in a network processor independent fashion. The egress connector 276 is used to transmit processed or partially processed packets to another recipient in the network processor 150'.

The libraries 192', 194', and 196' are used to allow network processor specific operations to be performed, particularly for manipulation of packets. Although specifically depicted, the libraries 192', 194', and 196' can thus be considered to be in communication and/or coupled with the network processor hardware 268, for example through the operating system 266. In a preferred embodiment, the libraries 192', 194', and 196' provide network processor specific information for protocol packet manipulation, configuration and control packet manipulation, and lookup table operations. Packet manipulation can be considered to be reading from, writing to, or otherwise modifying a packet. Lookup table operations generally include the ability to search for particular records as well as to insert, delete, or modify records in a table. The information provided by the libraries 192', 194', and 196' include functional interfaces. Such an interface is network processor, or platform, independent and is preferably consistent across multiple network processor platforms. Table 1 describes protocol packet library operations.

TABLE 1

| Service | Description |
| --- | --- |
| Calculate Checksum | Calculates Ones Complement Checksum for a byte stream |
| Compare Packet Fields | Compare bits/bytes/words in a packet with predefined value |
| Concatenate Packet | Concatenate the entire packet A, or the header or tail part of packet A, to the tail of packet B; can be used to create a new packet or split one packet into two packets |
| Copy Packet Fields | Copy bits/bytes/words from on packet to another packet |
| Create Packet | Allocate buffer space for a new packet |
| Duplicate Packet | Duplicate the bytes in packet A to a non-existent packet or to an existing packet |
| Get Packet Reference | Get a pointer to the packet memory space for reading or writing |
| Link Packet | Allow one packet to share data from another packet |
| Read From Packet | Read N bytes of data from a packet |
| Pad Packet | Extend the length of a packet by padding 0's in front of the CRC bytes |
| View Packet Header | Get a pointer to the first N bytes in the packet |
| Write to Packet | Overwrite N bytes in the packet |

Similarly, Table 2 describes control packet operations provided through the library 192', 194', or 196'.

TABLE 2

| Service | Description |
| --- | --- |
| Create Packet | Create a new packet |
| Duplicate Packet | Duplicate an existing packet |
| Get Header Information | Retrieves the header information from a packet |
| Modify Header Information | Modify the header fields in a packet |
| Get Next Element | Retrieve the next message element in the payload |
| Add Element | Add a message element in the payload |
| Get Raw Payload | Retrieve the entire payload section of a packet |
| Set Raw Payload | Write the entire payload section of a packet |
| Validate Packet | Verify the packet header |

Finally, Table 3 describes lookup table operations provided through the library 192', 194', or 196'.

TABLE 3

| Service | Description |
| --- | --- |
| Bind Application Procedure | Add an application procedure to the binding table so that it can be used to process lookup table entries |
| Delete Entry | Delete an entry from a lookup table and wait until the deletion is complete before returning to the calling application |
| Delete Entry No Wait | Initiate an entry deletion for a lookup table and return to the calling application without waiting for the deletion to complete |
| Get Search Results | Get the search result from a previously called Search Entry No Wait |
| Insert Entry | Insert an entry into a lookup table and wait for the insert to complete before returning to the calling application |
| Insert Entry No Wait | Initiate an entry insert in a lookup table and return to the calling application without waiting for the insert to complete |
| Search Entry | Search for an entry in a lookup table and return to the calling application after the search completes |
| Search Entry No Wait | Initiate a key search in a lookup table and return to the calling application before the search completes |
| Process Entry | Read every entry in a lookup table and pass it to an application procedure for processing |
| Unbind Application Procedure | Remove an application procedure from the binding table so that it can no longer be used to process lookup table entries |
| Update Entry | Update an entry in a lookup table and return to the calling application when the update completes |
| Update Entry No Wait | Initiate an entry update in a lookup table and return without completion of the update |

Thus, using the functions provided by the libraries 192', 194', and 196', in conjunction with other portions of the packet processing shells 180', 182', and 184', particularly the network processor independent protocol software blocks 186', 188', and 190', can be used in manipulating packets.

Figure 6:
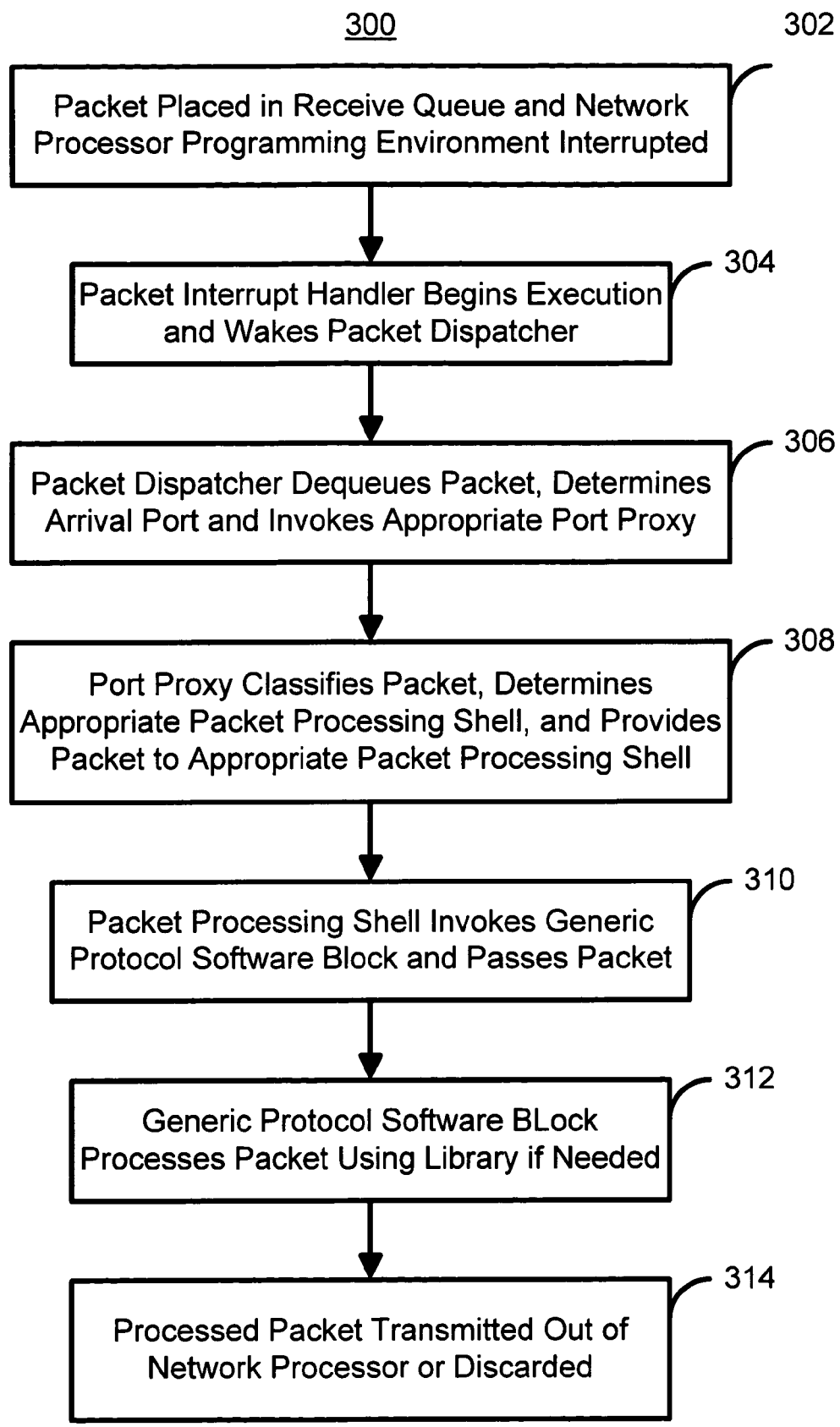
FIG. 6 is high-level flow chart of one embodiment of a method in accordance with the present invention for processing a packet using a network processor in accordance with the present invention.

FIG. 6 is high-level flow chart of one embodiment of a method 300 in accordance with the present invention for processing a packet using a network processor in accordance with the present invention. The method 300 is described in the context of FIGS. 2-5, particularly packet processing shell 180' in the network processor 150'.

The packet is placed in a receive queue and the network processor interrupted, via step 302. The packet interrupt handler 250 begins execution and wakes up the packet dispatcher 252, via step 304. The packet dispatcher 252 performs its operations, via step 306. In particular, the packet dispatcher 252 dequeues the packet, determines the hardware port on which the packet arrived, and invokes the appropriate port proxy 254, 256, or 258 in step 306. The port proxy 254, 256, or 258 classifies the packet and, based upon this packet classification, determines the appropriate packet processing shell 180', 182', or 184', via step 308. Also in step 208 the packet is provided to the appropriate packet processing shell 180', 182', and 184'. The packet processing shell 180', 182', and 184' invokes and provides the packet to the corresponding generic protocol software block 186', 188', or 190', respectively, via step 310. Thus, the network processor utilizes the generic protocol software that is preferably provided by the customer. The generic protocol software block 186', 188', or 190' process the packet, utilizing the appropriate library 192', 194', or 196', respectively, via step 312. When processing has completed, the packet may be transmitted out of the network processor 150', 160', or 170' using port proxy 254, 256, or 258 or discarded using discard queue proxy 264.

Thus, using the system 100, particularly communication system 120' and network processors 150, 160, 170, and 150', and the method 300 in accordance with the present invention, a scalable system using platform independent communication and having platform independent components can be provided. In addition to allowing for the configuration and management of heterogeneous network processors, the method 300 and system 100 allow for the development of portable network processor applications. Thus, networks are made more scalable. For example, the investment required by both customer and vendor in adding network processors can be substantially reduced.

A method and system has been disclosed for managing tables for heterogeneous network processors using a network processor independent control application. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method for generically communicating between a plurality of heterogeneous network processors in a network and at least one host processor, the method comprising:

including at least one standardized interface in each of the plurality of heterogeneous network processors, each of the plurality of heterogeneous network processors further including a plurality of packet processing shells, wherein each one of the plurality of packet processing shells includes a generic protocol software block and a library, and wherein each generic protocol software block is network processor independent, and further wherein each one of the plurality of packet processing shells included in each one of the plurality of heterogeneous network processors performs a different function;

including, in each one of the plurality of heterogeneous network processors, a packet dispatcher and a plurality of port proxies, wherein each one of the plurality of port proxies is associated with a corresponding one of a plurality of ports included in each one of the plurality of network processors;

utilizing a standardized transport layer, the standardized transport layer compatible with the at least one standardized interface;

providing a generic message application layer, the generic message application layer defining at least one generic payload and at least one generic message type for configuration communications between the plurality of heterogeneous network processors and the at least one host processor;

providing a network processor independent system configuration application within the at least one host processor for configuring the plurality of heterogeneous network processors;

receiving, at a particular port included in a particular one of the plurality of heterogeneous network processors, a packet;

in response to receiving the packet, determining by a particular packet dispatcher included in the particular one of the plurality of heterogeneous network processors, the particular port;

providing, by the particular packet dispatcher, the packet to a particular one of a plurality of port proxies included in the particular one of the plurality of heterogeneous network processors that corresponds with the particular port;

determining, by the particular one of the plurality of port proxies, a classification of the packet; and using, by the particular one of the plurality of port proxies, the classification to determine to which one of the plurality of packet processing shells included in the particular one of the plurality of heterogeneous network processors to provide the packet.

2. The method of claim 1 wherein the at least one generic message type includes a request type, a response type, a notify type.

3. The method of claim 1 wherein the at least one generic payload includes at least one element of a plurality of elements.

4. The method of claim 3 wherein the plurality of elements includes an invoke element, a result element, an error element, an error element, and an event element, the invoke element indicating a request, the result element indicating at least one result of at least one operation, the error element indicating error information, the event element indicating an event in at least one of the plurality of heterogeneous network processors.

5. The method of claim 4 wherein the at least one generic message type includes a request type, a response type, a notify type, the request type including at least one of the invoke element, the response type including at least one of the result element and the error element, the notify type including at least one of the event element.

6. The method of claim 1, further comprising:
providing a receive queue and a packet interrupt handler in each one of the plurality of heterogeneous network processors;
in response to receiving the packet at the particular port, placing the packet in the receive queue that is included in the particular one of the plurality of heterogeneous network processors;
interrupting the particular one of the plurality of heterogeneous network processors;
in response to the interrupt, executing a particular packet interrupt handler that is included in the particular one of the plurality of heterogeneous network processors; and
waking up, by the particular packet interrupt handler, the particular packet dispatcher.

7. A method for utilizing a plurality of heterogeneous network processors in a network and at least one host processor, the method comprising:
including at least one standardized interface in each one of a plurality of heterogeneous network processors, each of the plurality of heterogeneous network processors further including a plurality of packet processing shells, wherein each one of the plurality of packet processing shells includes a generic protocol software block and a library, and wherein each generic protocol software block is network processor independent, and further wherein each one of the plurality of packet processing shells included in each one of the plurality of heterogeneous network processors performs a different function;
including, in each one of the plurality of heterogeneous network processors, a packet dispatcher and a plurality of port proxies, wherein each one of the plurality of port proxies is associated with a corresponding one of a plurality of ports included in each one of the plurality of heterogeneous network processors:
receiving, at a particular port included in a particular one of the plurality of heterogeneous network processors, a packet;
in response to receiving the packet, determining by a particular packet dispatcher included in the particular one of the plurality of heterogeneous network processors, the particular port;
providing, by the particular packet dispatcher, the packet to a particular one of a plurality of port proxies included in the particular one of the plurality of heterogeneous network processors that corresponds with the particular port;
determining, by the particular one of the plurality of port proxies, a classification of the packet, wherein the packet was classified using a portion of the particular one of the plurality of heterogeneous network processors developed by a vendor of the particular one of the plurality of heterogeneous network processors; and
using, by the particular one of the plurality of port proxies, the classification to determine to which one of the plurality of packet processing shells included in the particular one of the plurality of heterogeneous network processors to provide the packet.

8. The method of claim 7, further comprising:
providing a receive queue and a packet interrupt handler in each one of the plurality of heterogeneous network processors;
in response to receiving the packet at the particular port, placing the packet in the receive queue that is included in the particular one of the plurality of heterogeneous network processors;
interrupting the particular one of the plurality of heterogeneous network processors;
in response to the interrupt, executing a particular packet interrupt handler that is included in the particular one of the plurality of heterogeneous network processors; and
waking up, by the particular packet interrupt handler, the particular packet dispatcher.

* * * * *

UNITED STATES PATENT AND TRADEMARK OFFICE
CERTIFICATE OF CORRECTION

PATENT NO. : 7,653,681 B2 Page 1 of 1
APPLICATION NO. : 11/035644
DATED : January 26, 2010
INVENTOR(S) : Alexander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Twenty-third Day of November, 2010

David J. Kappos
*Director of the United States Patent and Trademark Office*